US011264932B2

(12) United States Patent
Creary et al.

(10) Patent No.: US 11,264,932 B2
(45) Date of Patent: Mar. 1, 2022

(54) APPARATUS FOR QUASI-SENSORLESS ADAPTIVE CONTROL OF SWITCHED RELUCT ANGE MOTOR DRIVES

(71) Applicant: Turntide Technologies Inc., Sunnyvale, CA (US)

(72) Inventors: Trevor A. Creary, San Jose, CA (US); Mahesh Krishnamurthy, Wheaton, IL (US); Piyush C. Desai, Des Plains, IL (US); Mark Johnston, Los Altos Hills, CA (US); Timothy Knodel, Cupertino, CA (US)

(73) Assignee: Turntide Technologies Inc., Sunnyvale, CA (US)

( * ) Notice: Subject to any disclaimer, the term of this patent is extended or adjusted under 35 U.S.C. 154(b) by 0 days.

(21) Appl. No.: 16/945,269

(22) Filed: Jul. 31, 2020

(65) Prior Publication Data

US 2020/0366229 A1    Nov. 19, 2020

Related U.S. Application Data

(63) Continuation of application No. 16/390,910, filed on Apr. 22, 2019, now Pat. No. 10,734,934, which is a
(Continued)

(51) Int. Cl.
  *H02K 23/00*    (2006.01)
  *H02P 25/089*    (2016.01)
  *H02P 25/092*    (2016.01)

(52) U.S. Cl.
  CPC .......... *H02P 25/089* (2016.02); *H02P 25/092* (2016.02); *H02P 2203/01* (2013.01); *H02P 2205/01* (2013.01)

(58) Field of Classification Search
  CPC .. H02P 25/089; H02P 25/092; H02P 2203/01; H02P 2205/01; H02P 4/00
  See application file for complete search history.

(56) References Cited

U.S. PATENT DOCUMENTS

| 2003/0128026 A1 | 7/2003 | Lutz |
| 2006/0069488 A1* | 3/2006 | Sychra ...................... B60L 7/26 |
| | | 701/69 |

OTHER PUBLICATIONS

Salmasi F R et al: "Virtual auto-tuning position and torque sensors for switched reluctance motor drives", 2004 IEEE Applied Power Electronics Conference and Exposition, APEX 04, IEEE, Anaheim, CA, USA, vol. 2, Feb. 22, 2004 (Feb. 22, 2004), pp. 1355-1361, XP010704418, DOI: 10.1109/APEC.2004.1295999 ISBN: 978-0-7803-8269-5.

(Continued)

*Primary Examiner* — Karen Masih
(74) *Attorney, Agent, or Firm* — Temmerman Law; Mathew J. Temmerman (57) ABSTRACT

A method and apparatus for quasi-sensorless adaptive control of a high rotor pole switched-reluctance motor (HRSRM). The method comprises the steps of: applying a voltage pulse to an inactive phase winding and measuring current response in each inactive winding. Motor index pulses are used for speed calculation and to establish a time base. Slope of the current is continuously monitored which allows the shaft speed to be updated multiple times and to track any change in speed and fix the dwell angle based on the shaft speed. The apparatus for quasi-sensorless control of a high rotor pole switched-reluctance motor (HRSRM) comprises a switched-reluctance motor having a stator and a rotor, a three-phase inverter controlled by a processor connected to the switched-reluctance motor, a load and a converter.

20 Claims, 6 Drawing Sheets

Related U.S. Application Data continuation of application No. 15/787,444, filed on Oct. 18, 2017, now Pat. No. 10,270,379.

(60) Provisional application No. 62/519,807, filed on Jun. 14, 2017.

(56) References Cited

OTHER PUBLICATIONS

Wiedemann, Simon et al: "Dynamic Testing characterization of a synchronous reluctance machine", 2016 Eleventh International Conference on Ecological Vehicles and Renewable Energies (EVER). IEEE, Apr. 6, 2016 (Apr. 6, 2016), pp. 1-7, XP032903475, DOI: 10.1109/EVER.2016.7476426.

* cited by examiner

APPARATUS FOR QUASI-SENSORLESS ADAPTIVE CONTROL OF SWITCHED RELUCTANGE MOTOR DRIVES

RELATED APPLICATIONS

This application is a continuation application of U.S. patent application Ser. No. 16/390,910, now granted as U.S. Pat. No. 10,734,934, and which is a continuation of U.S. patent application Ser. No. 15/787,444, now granted as U.S. Pat. No. 10,270,379, and which claims priority from the United States provisional application with Ser. No. 62/519,807, which was filed on Jun. 14, 2017. The disclosure of these applications are incorporated herein as if set out in full.

BACKGROUND OF THE DISCLOSURE

Technical Field of the Disclosure

This invention relates generally to switched reluctance motor drive systems, and more particularly to a system for rotor position estimation based on the measurement of inductance of the phases of the switched reluctance motor.

Description of the Related Art

A switched reluctance motor ("SRM") is a rotating electric machine where both stator and rotor have salient poles. The switched reluctance motor is a viable candidate for various motor control applications due to its rugged and robust construction. The switched reluctance motor is driven by voltage strokes coupled with a given rotor position. The SRM is a brushless electrical machine with multiple poles on both rotor and stator. The stator has phase windings, unlike the rotor which is unexcited and has no windings or permanent magnets mounted thereon. Rather, the rotor of an SRM is formed of a magnetically permeable material, typically iron, which attracts the magnetic flux produced by the windings on the stator poles when current is flowing through them. The magnetic attraction causes the rotor to rotate when excitation to the stator phase windings is switched on and off in a sequential fashion in correspondence to rotor position. For an SRM, a pair of diametrically opposed stator poles produces torque in order to attract a pair of corresponding rotor poles into alignment with the stator poles. As a consequence, this torque produces movement in a rotor of the SRM.

The use of switched reluctance motor drives for industrial applications is of recent origin. SRM drives have been considered as a possible alternative to conventional drives in several variable speed drive applications. In conventional SRMs, a shaft angle transducer, such as an encoder or a resolver, generates a rotor position signal and a controller reads this rotor position signal. In an effort to improve reliability while reducing size and cost, various approaches have previously been proposed to eliminate the shaft position sensor by determining the reference commutation angle. These approaches implement indirect rotor position sensing by monitoring terminal voltages and currents of the motor. The performance of a switched reluctance machine depends, in part, on the accurate timing of phase energization with respect to rotor position. These methods are useful when at least one phase is energized and the rotor is spinning.

Another approach describes a system and method for achieving sensorless control of SRM drives using active phase voltage and current measurements. The sensorless system and method generally relies on a dynamic model of the SRM drive. Active phase currents are measured in real-time and, using these measurements, the dynamic equations representing the active phases are solved through numerical techniques to obtain rotor position information. The phase inductances are represented by a Fourier series with coefficients expressed as polynomial functions of phase currents to compensate for magnetic saturation. The controller basically runs the observer in parallel with the drive system. Since the magnetic characteristics of the motor are accurately represented, the state variables, as computed by the observer, are expected to match the actual state variables. Thus, rotor position, which is also a state variable, will be available indirectly. This system teaches the general method for estimating rotor position using phase inductance measured from the active phase. Here, they apply voltage to the active phase and measure the current response to measure position. This current magnitude is kept low to minimize any negative torque generated at the shaft of the motor.

Another approach describes a method of indirect motor position sensing that involves applying voltage sensing pulses to one unenergized phase. The result is a change in phase current which is proportional to the instantaneous value of the phase inductance. Proper commutation time is determined by comparing the change in phase current to a reference current, thereby synchronizing phase excitation to rotor position. Phase excitation can be advanced or retarded by decreasing or increasing the threshold, respectively. Due to the unavailability of inactive phases during higher speeds, this commutation method which makes use of the inactive phases of the SRM is limited to low speeds. Furthermore, although current and torque levels are relatively small in an inactive phase, they will contribute to a loss in SRM efficiency in this application.

Yet another approach discloses a rotor position estimator for an SRM based on instantaneous phase flux and phase current measurements. Phase current and flux sensing are performed for the phases in a predetermined sequence that depends on the particular quadrant of SRM operation. For each phase in the predetermined sequence of sensing, phase flux and phase current measurements are made during operation in a pair of predetermined sensing regions, each defined over a range of the rotor positions. The rotor position estimates are derived from the phase flux and phase current measurements for each respective phase during the respective sensing regions thereof. The rotor position estimates for each phase are normalized with respect to a common reference phase, and a rotor position estimate for the SRM is computed according to an equation which accounts for the fact that for any given rotor position determined, the rotor poles of the SRM may be approaching alignment or misalignment. Sampled phase voltage and phase current are integrated to obtain phase flux.

There remains a need for a method of quasi-sensorless adaptive control of a switched reluctance motor drive using a unique sequence of relation between phase inductances to enhance the accuracy of rotor position estimation. This method would very tightly monitor the speed with as many as 30 updates per revolution, which would thus provide a higher resolution than several sensorless approaches currently in use. Such a needed method would automatically accommodate for motor-to-motor or process variations, since it would not assume complete uniformity among all manufactured machines. Further, this approach would create a control algorithm that would not need to be calibrated for all motor specifications and power ratings. Moreover, this method would be able to naturally calibrate the control algorithm to the inductance profile of the machine that is being tested. Such a system would not require any adjustment in the control algorithm and would not require any prior knowledge of manufacturing specifications of the motor, which would further reduce the constructional detail burden of the machine manufacturer. This approach would use its own set of steps for automatically calibrating the inductance profile for any machine and would thus save time and resources involved in setting up and testing of the machine in an industry setting. Finally, the method would be reliable, robust, and completely scalable and would provide a clear technique that actively seeks to calibrate the model to each machine that is manufactured. The present embodiment overcomes shortcomings in the field by accomplishing these critical objectives.

SUMMARY OF THE DISCLOSURE

To minimize the limitations found in the existing systems and methods, and to minimize other limitations that will be apparent upon the reading of this specification, the preferred embodiment of the present invention provides a method and apparatus for quasi-sensorless adaptive control of a high rotor pole switched-reluctance motor (HRSRM).

The method comprises the steps of: estimating an initial position of the rotor of the HRSRM using a unique sequence of relation between the phase inductances of the HRSRM, then aligning the rotor with respect to the initial position to start with a known phase and to provide rotation in the correct direction. Current is applied to an active phase winding to rotate the motor and estimate position using a diagnostic pulse on an inactive phase winding during the initial rotation by estimating the inductance profile. A voltage pulse is applied to the inactive phase winding and current response in each inactive phase is measured. Next the system applies multiple diagnostic pulses to the inactive phase to identify the next phase and a firm time base is established for a software control module on a magnetic sensor. Next the system calculates the speed and updates the time base by generating motor index pulses from the magnetic sensor. The shaft speed of the motor is calibrated which in turn calibrates a software encoder to operate on the time base. The method cancels out a switching threshold of the magnetic sensor and, monitors the slope of the current waveform in the active phase to fine-tune a firing angle from the encoder software. The pulse time $t_{on}$ based on the estimated time base and the shaft speed is adjusted to track any monitored change in speed. The dwell angle based on the shaft speed is fixed.

The apparatus for quasi-sensorless control of a high rotor pole switched-reluctance motor (HRSRM) comprises a switched-reluctance motor having a stator and a rotor, a three-phase inverter controlled by a processor connected to the switched-reluctance motor, a load and a converter. The rotor includes a plurality of circumferentially spaced rotor poles and rotationally related to a motor shaft having a magnetic sensor. The three-phase inverter is adaptable to act as a power supply to the switched-reluctance motor, the processor having a software control module and a software encoder. The load is connected to the switched-reluctance motor via an inline torque meter and the converter connected to the load.

It is a first objective of the present invention to provide a method for quasi-sensorless adaptive control of switched reluctance motor drive that employs a unique sequence of relation between phase inductances to enhance the accuracy of rotor position estimation.

A second objective of the present invention is to provide a method that monitors the calculated shaft speed and continuously updates if any change in speed is detected.

A third objective of the present invention is to provide a method that creates a control algorithm that does require calibration for all motor specifications and power ratings.

A fourth objective of the present invention is to provide a method that naturally calibrates the control algorithm to the inductance profile of the machine that is being tested.

Another objective of the present invention is to provide a method and apparatus that does not require any adjustment in the control algorithm or any prior knowledge of manufacturing specifications of the motor, which eliminates the constructional details needed from the machine manufacturer.

Yet another objective of the present invention is to provide a method that automatically calibrates the inductance profile for any machine and thus saves time and resources in the characterization and testing of the machine in an industry setting.

Still another objective of the present invention is to provide a method that is reliable, robust, and scalable and provides a clear technique that actively seeks to calibrate the model to each machine that is manufactured.

These and other advantages and features of the present invention are described with specificity so as to make the present invention understandable to one of ordinary skill in the art.

BRIEF DESCRIPTION OF THE DRAWINGS

In order to enhance their clarity and improve understanding of these various elements and embodiments of the invention, elements in the figures have not necessarily been drawn to scale. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
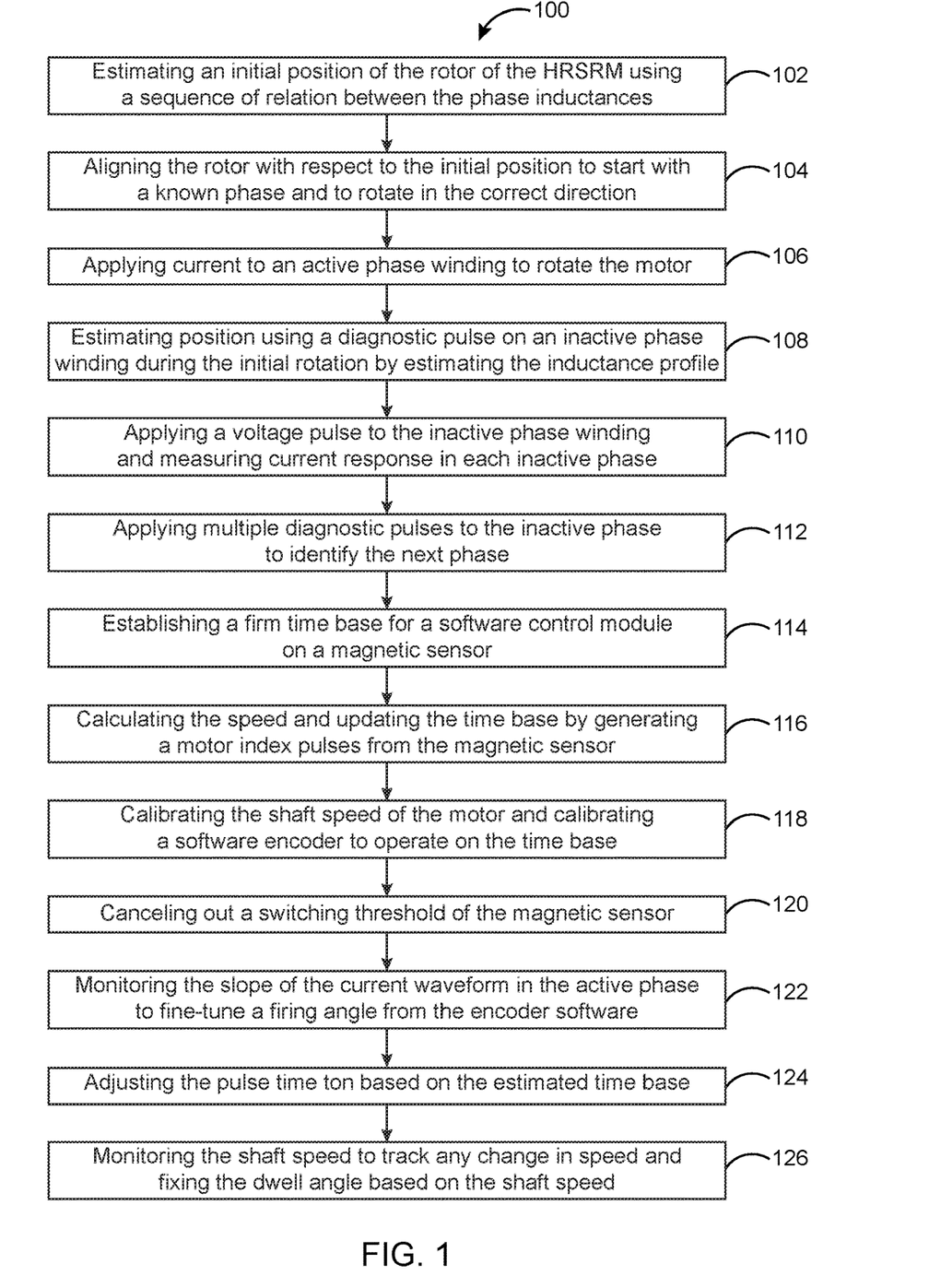
FIG. 1 illustrates a flow chart of a method for controlling a high rotor pole switched-reluctance motor (HRSRM) in accordance with the present invention.
Figure 2:
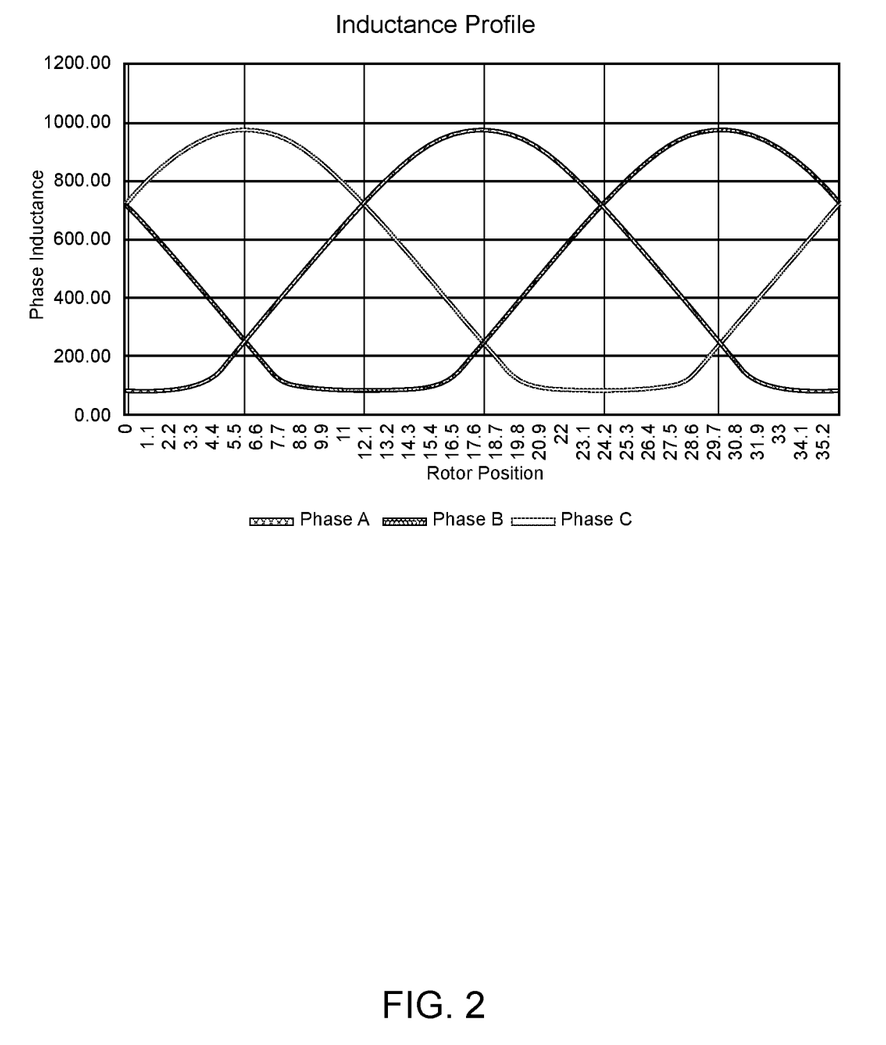
FIG. 2 is a graph illustrating an inductance profile according to the phase changes of a three phase SRM in accordance with the present invention.

Referring to FIGS. 1-2, a flow chart of a method for controlling a high rotor pole switched-reluctance motor (HRSRM) 100 in accordance with present invention is illustrated in FIG. 1. The method 100 described in the present embodiment enhances the accuracy of estimating the rotor position and also allows positioning of at least one phase of the SRM at the fully aligned position from either rotating in a clockwise or counterclockwise direction. The method 100 allows quasi-sensorless control of speed in the switched reluctance motor and creates a control algorithm that naturally calibrates with the inductance profile of the SRM. For the proper switching operation of the SRM, it is important to synchronize the stator phase excitation with the rotor position.

The method 100 comprises the steps of: estimating an initial position of the rotor of the HRSRM using a unique sequence of relation between the phase inductances of the HRSRM as indicated at block 102.

The rotor produces an inductance profile in each of the stator poles as each of the rotor poles comes into and out of alignment with the stator poles when the rotor is rotated. The inductance profile of a three phase SRM is illustrated in FIG. 2. For example, to estimate the initial rotor position, six startup regions are defined in the inductance profile as illustrated in FIG. 2 where the values of the phase inductances have a fixed relationship. Let $L_a$, $L_b$ and $L_c$ be the inductances of phases A, B and C respectively. From the inductance relationship, which phase or phases needs to be excited to drive the motor to a fully aligned position can be identified. The initial position is determined by applying a voltage pulse to each phase winding in turn and measuring the time it takes for the resulting phase current to reach a preset limit.

To determine the initial position, a voltage pulse is applied to each phase winding in turn and the time it takes for the resulting phase current to reach a preset limit is measured. The current ramp time is a function of the phase inductance and voltage pulse amplitude and is given by the following equation:

$$E=L*di/dt$$

where E is the applied voltage reference amplitude, L is the phase inductance and i is the phase current.

The time for the current to rise to the reference limit is longer the greater the value of the inductance. For an initial phase current of zero and a reference current of Iref, the time Tp to reference is given by;

$$Tp=L*Iref/E$$

Initial position is identified from the measured current ramp time.

Based on the initial position, hard alignment is set so as to start with a known phase and to rotate in the correct direction as indicated at block 104. Current is applied to an active phase winding to rotate the motor as indicated at block 106. The active phase is essentially the phase that has a rotor pole nearest the closest aligned position. During the initial rotation, position is estimated by applying a diagnostic pulse on an inactive phase winding and by estimating the inductance profile as indicated at block 108. The inductance profile of SRM indicates that inductance is at a maximum when the rotor is in an aligned position and minimum inductance occurs when the rotor is in an unaligned position. The next step is the application of a voltage pulse to the inactive phase winding and measurement of current response in each inactive phase as indicated at block 110. Multiple diagnostic pulses are applied to the inactive phase to identify when the next phase must be fired as indicated at block 112 and establishing a firm time base for a software control module on a magnetic sensor as indicated at block 114. The magnetic sensor generates index pulses from the magnetic sensor (20 edges per revolution) to calculate speed and continuously update the time base. Multiple diagnostic pulses can be applied for 10 rotations to establish a firm time base for the software control module to fire the next phase. After 10 rotations, the software timing takes over and the inactive phase is no longer necessary to maintain operation. The motor speed is calculated and the time base is updated by generating motor index pulses from the magnetic sensor as indicated at block 116. Three signals are generated per rotor pole. In other words, shaft speed for the motor is calibrated 30 times for a motor with 10 rotor poles. This step is repeated for 10 (or more, for higher accuracy) revolutions and is used to calibrate a software encoder to operate on this time base. As indicated at block 118, the shaft speed of the motor is calibrated and the software encoder is calibrated to operate on the time base. The time base is established to avoid any slip in the calculated value of speed. The method of the present invention also cancels out the switching threshold of the magnetic sensor as indicated at block 120. This ensures that the time-base is firmly established in the control algorithm to avoid any slip in calculated values. The slope of the current waveform in the active phase is monitored to fine-tune a firing angle from the encoder software as indicated at block 122. The slope of current is evaluated for a fixed duration of time to fine-tune the firing angle from encoder software. The calculated shaft speed is updated 30 times in one cycle to continuously track any change in speed.

Based on the estimated time base, the pulse time $t_{on}$ is individually adjusted for each phase as indicated at block 124. By this step, pulse $t_{on}$ is individually adjusted for each phase, equaling thirty corrections per mechanical revolution. The method then monitors the shaft speed to track any change in speed and fix the dwell angle based on the shaft speed as indicated at block 126. The speed can be very tightly monitored, in one instance with as many updates as 30 per revolution, thereby providing better resolution than several sensorless approaches currently in use.

Dwell is fixed based on speed. A current band is established that reduces dwell if the command current is below the lower band and increases dwell if the commanded current is above the upper band. If the commanded current is below a lower band, the dwell angle is reduced and if the commanded current is above an upper band, the dwell angle is increased. This has the effect of increasing the phase current at lower power levels thereby operating the SRM at a higher saturation level. For a given power output, decreasing dwell will command a lower phase current.

Figure 3:
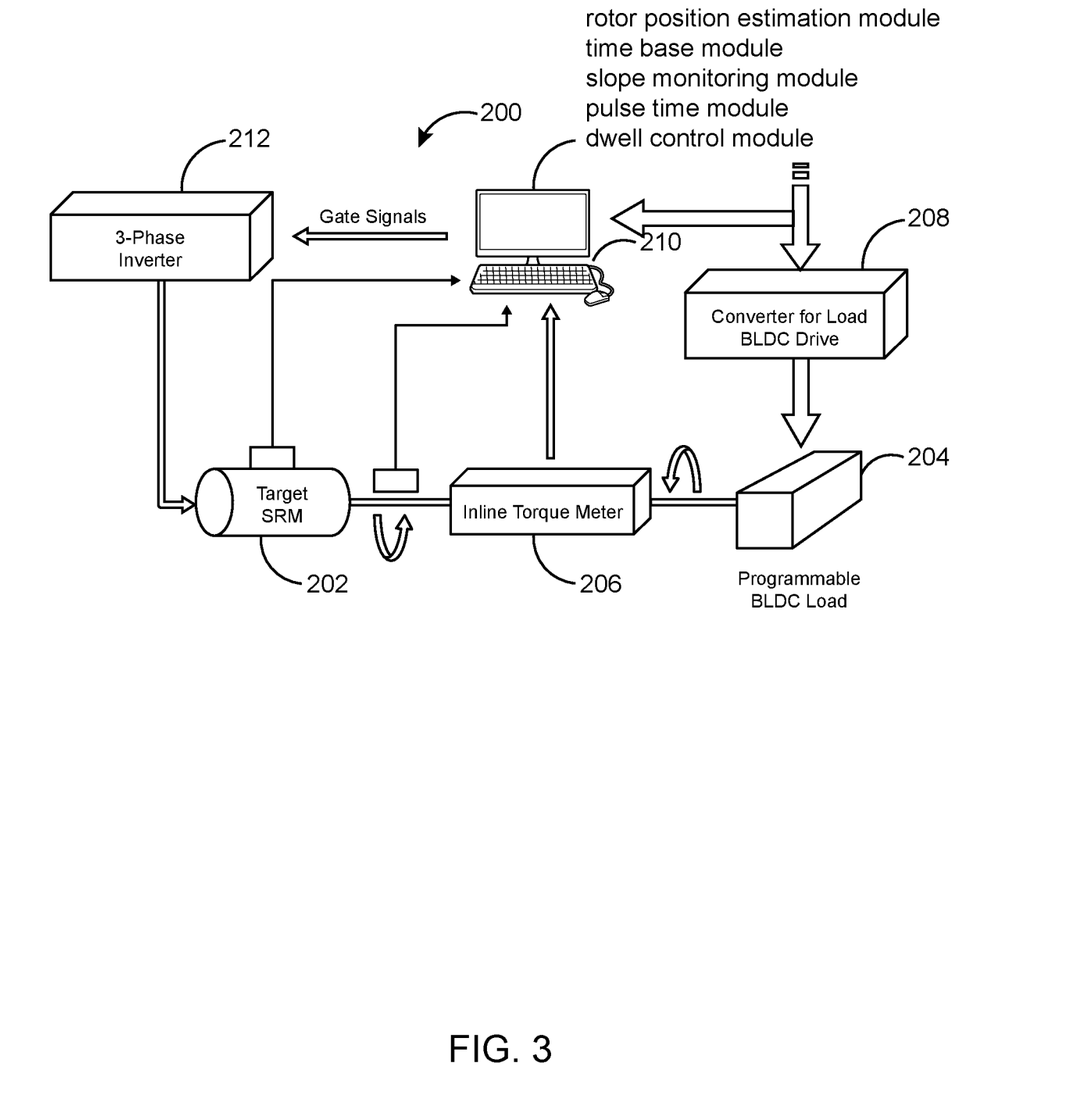
FIG. 3 illustrates a block diagram of an apparatus for controlling the high rotor pole switched-reluctance motor (HRSRM) in accordance with the present invention.

FIG. 3 represents an apparatus 200 for quasi-sensorless control of the high rotor pole switched-reluctance motor (HRSRM) comprising a switched-reluctance motor 202 having a stator and a rotor. The rotor comprises a plurality of circumferentially spaced rotor poles and is rotationally related to a motor shaft, the motor shaft having a magnetic sensor. The HRSRM further comprises a Programmable brushless direct current load 204 connected to an output of the switched-reluctance motor 202 via an inline torque meter 206 and a converter 208 connected to the load. A software encoder is positioned in the control processor 210, the software encoder establishing a firm time base on the magnetic sensor. The rotor produces an inductance profile in each of the stator poles as each of the rotor poles comes into and out of alignment with the stator poles when the rotor is rotated. At least three signals are generated per rotor pole so that the shaft speed of the motor is calibrated. A three-phase inverter 212 controlled by the control processor 210 is connected to the switched-reluctance motor 202. The inverter 212 is adaptable to act as a power supply for the switched-reluctance motor 202, the control processor 210 has a software control module and the software encoder.

The quasi-sensorless control of the high rotor pole switched-reluctance motor (HRSRM) 202 naturally calibrates the control algorithm to the inductance profile of the switched-reluctance motor 202 that is being tested. The switched-reluctance motor 202 is scalable to all power levels and the creation of a control algorithm does not have to be calibrated for all motor specifications and power ratings. The switched-reluctance motor 202 can automatically accommodate for motor-to-motor or process variations.

In one embodiment, the system comprises a method for controlling a high rotor pole switched-reluctance motor (HRSRM), the method comprising the steps of: estimating an initial position of the rotor of the HRSRM using a unique sequence of relation between the phase inductances of the HRSRM; applying current to an active phase winding to rotate the motor; applying a voltage pulse to an inactive phase winding; measuring current response in the inactive phase; applying multiple diagnostic pulses to the inactive phase to identify the next phase; establishing a firm time base for a software control module on a magnetic sensor; updating the time base by generating a motor index pulse from the magnetic sensor; calculating a shaft speed of the motor and calibrating a software encoder to operate on the time base; canceling out a switching threshold of the magnetic sensor; monitoring a slope of the current waveform in the active phase to fine-tune a firing angle from the encoder software; adjusting the pulse time $t_{on}$ based on the estimated time base; monitoring the shaft speed to track any change in the speed; and adjusting the dwell angle based on the shaft speed and the current.

Figure 4A:
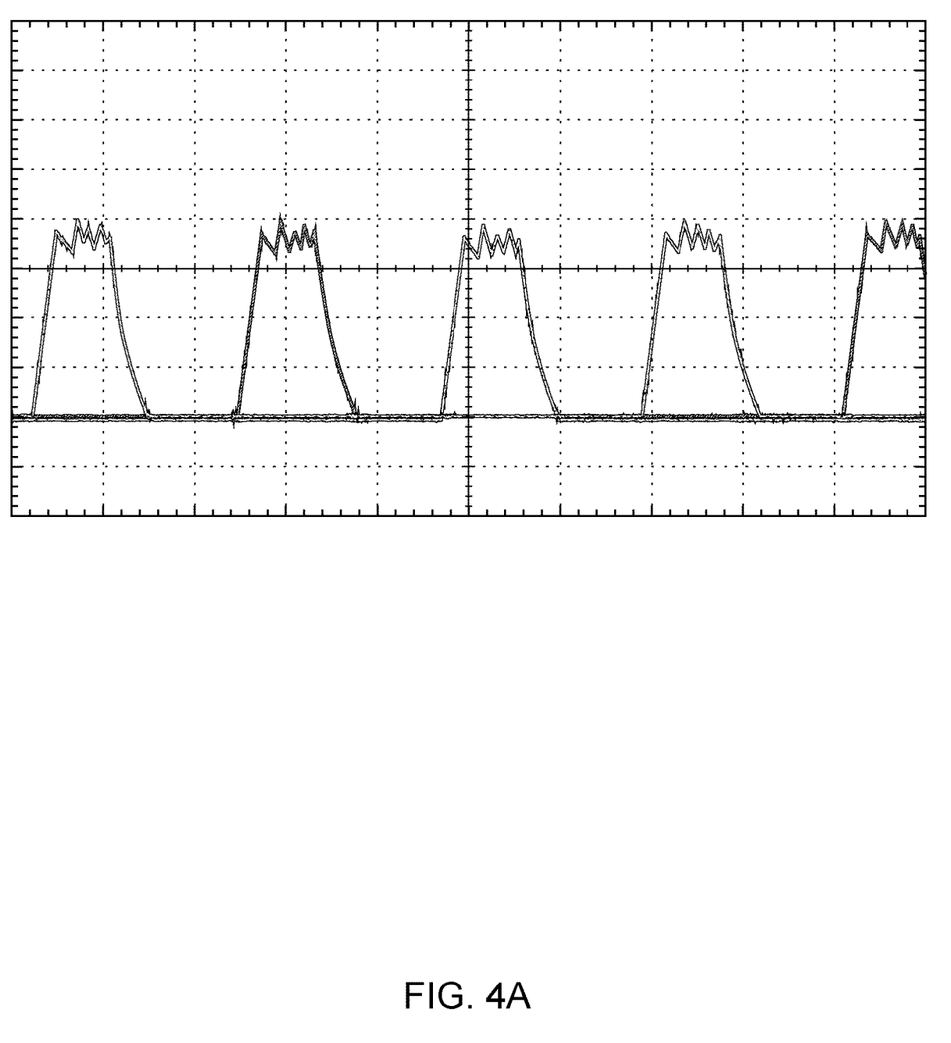
FIG. 4A is a graph illustrating a current waveform of a three-phase SRM at a particular load in accordance with the present invention.
Figure 4B:
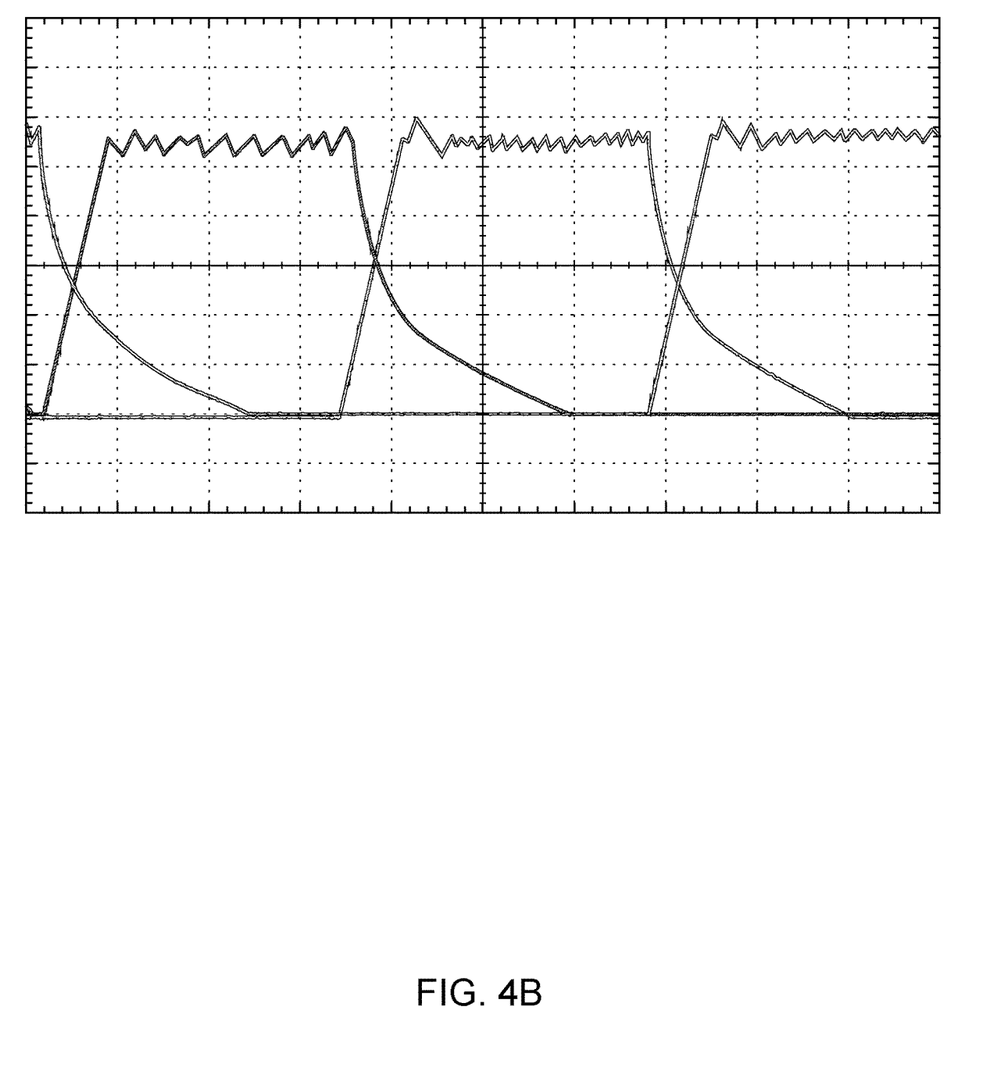
FIG. 4B is a graph illustrating the current waveform of the three-phase SRM at another load in accordance with the present invention.
Figure 4C:
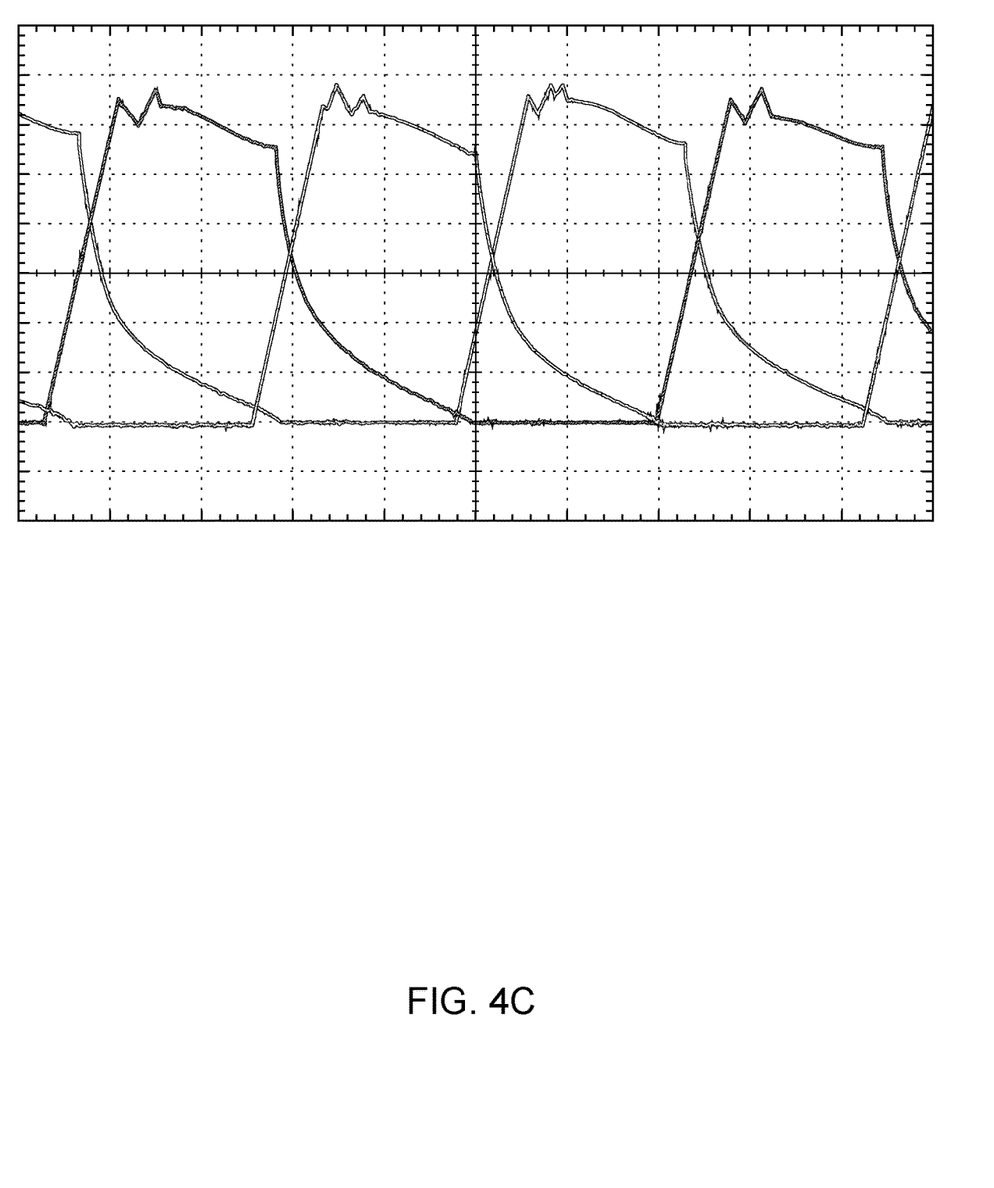
FIG. 4C is a graph illustrating the current waveform of the three-phase SRM at yet another load in accordance with the present invention.

Referring to FIGS. 4A-4C, the current waveforms of the three-phase SRM at different loads in accordance with the present invention are illustrated. A current waveform of the three-phase SRM at a light load with a speed of 900 RPM and 1 Nm is illustrated in FIG. 4A and the current waveform of the three-phase SRM at a partial load having a speed of 1200 RPM and 6 Nm is illustrated in FIG. 4B. FIG. 4C illustrates the current waveform of the three-phase SRM at full load having a speed of 1800 RPM and 6 Nm. The method of the present invention monitors the slope of the current waveform to fine-tune the firing angle from the encoder software. FIGS. 4A-4C illustrate the variation of dwell angle in accordance with load variations. The processor with the software control module advances or retards the timing of the current waveform in response to load or commanded current changes. The amount of advance or retard is chosen to maintain the current slope to a constant reference value.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for controlling a high rotor pole switched-reluctance motor (HRSRM), the method comprising steps of:
   a) providing an HRSRM with a rotor;
   b) applying current to an active phase winding to rotate the rotor;
   c) establishing a time base for a software control module on a magnetic sensor;
   d) updating the time base by generating a motor index pulse from the magnetic sensor;
   e) calculating a shaft speed of the motor;
   f) canceling out a switching threshold of the magnetic sensor;
   g) monitoring a slope of a current waveform in the active phase to fine-tune a firing angle based on said shaft speed;
   h) adjusting a pulse time $t_{on}$ based on an estimated time base;
   i) monitoring the shaft speed to track any change in the shaft speed; and
   j) adjusting a dwell angle based on the shaft speed and the current.

2. The method of claim 1 further comprising:
   a. applying a voltage pulse to an inactive phase winding of the HRSRM;
   b. measuring current response in the inactive phase of the HRSRM;
   c. applying multiple diagnostic pulses to the inactive phase of the HRSRM.

3. The method of claim 2 wherein after ten rotations the software control module establishes the time base and the inactive phase is not necessary to maintain operation.

4. The method of claim 1 wherein at least three signals are generated per rotor pole and the shaft speed of the motor is calibrated.

5. The method of claim 1 wherein the time base is established to avoid slip in calculated value of speed.

6. The method of claim 1 wherein the dwell angle is reduced if the commanded current is below a lower band.

7. The method of claim 1 wherein the dwell angle is increased if the commanded current is above an upper band.

8. A method for quasi-sensorless adaptive control of a high rotor pole switched-reluctance motor (HRSRM), the method comprising steps of:
   a) providing an HRSRM with a rotor;
   b) aligning the rotor with respect to an initial position to start with a known phase and to rotate in a direction;
   c) applying current to an active phase winding to rotate the motor;
   d) establishing a time base for a software control module on a magnetic sensor;
   e) calculating a speed and updating the time base by generating a motor index pulses from the magnetic sensor;
   f) calibrating a shaft speed of the motor and calibrating a software encoder to operate on the time base;
   g) canceling out a switching threshold of the magnetic sensor;
   h) monitoring the slope of the current waveform in the active phase to fine-tune a firing angle from an encoder software;
   i) adjusting a pulse time $t_{on}$ based on an estimated time base; and
   j) monitoring the shaft speed to track any change in speed and fixing a dwell angle based on the shaft speed.

9. The method of claim 8 wherein the rotor produces an inductance profile in each of the stator poles as each of the rotor poles comes into and out of alignment with the stator poles when the rotor is rotated.

10. The method of claim 8 wherein the active phase winding is the phase that has a rotor pole close to the aligned position.

11. The method of claim 8 wherein a pulse of voltage is applied to the phase winding to measure the current response.

12. The method of claim 8 further comprising
   a. estimating position using a diagnostic pulse on an inactive phase winding during an initial rotation by estimating the inductance profile;
   b. applying a voltage pulse to the inactive phase winding and measuring current response in each inactive phase;
   c. applying multiple diagnostic pulses to the inactive phase to identify the next phase;
   d. wherein the multiple diagnostic pulses are applied for at least ten rotations to establish the time base for the software control module.

13. The method of claim 12 wherein after ten rotations the software control module establishes the time base and the inactive phase is not necessary to maintain operation.

14. The method of claim 8 wherein at least three signals are generated per rotor pole and the shaft speed of the motor is calibrated.

15. The method of claim 8 wherein the dwell angle is reduced if the commanded current is below a lower band.

16. The method of claim 8 wherein the dwell angle is increased if the commanded current is above an upper band.

17. An apparatus for quasi-sensorless control of a high rotor pole switched-reluctance motor (HRSRM) comprising:
   a switched-reluctance motor having a stator and a rotor, the rotor having a plurality of circumferentially spaced rotor poles, the rotor rotationally related to a motor shaft having a magnetic sensor;
   a three-phase inverter controlled by a processor connected to an input of the switched-reluctance motor, the three-phase inverter adaptable to provide a power supply the switched-reluctance motor, the processor having a software control module and a software encoder;
   a load connected to an output of the switched-reluctance motor via an inline torque meter;
   a converter connected to the load; and
   a software control module at the processor, the software control module comprising:
      a rotor position estimation module to determine an initial position of the rotor utilizing a sequence of relation between phase inductances of the HRSRM, to estimate rotor position and to establish a firm time base for the software control module;
      a time base module to calculate a shaft speed;
      a slope monitoring module to monitor slope of a current waveform in an active phase;
      a pulse time module to adjust pulse time based on an estimated time base; and
      a dwell control module to fix a dwell angle and to establish a current band for controlling a dwell angle thereby operating the SRM at a saturation level.

18. The apparatus of claim 17 wherein a time base is established in the magnetic sensor utilizing an inactive phase.

19. The apparatus of claim 17 wherein the time base is established to avoid slip in calculated value of speed.

20. The apparatus of claim 17 wherein at least three signals are generated per rotor pole and the shaft speed is calibrated.

* * * * *